US006769980B2

(12) United States Patent
Wolters et al.

(10) Patent No.: US 6,769,980 B2
(45) Date of Patent: Aug. 3, 2004

(54) CROP RESIDUE FLOW GUIDE WITH FLOW-THROUGH CAPABILITY FOR A ROTARY CROP RESIDUE SPREADER OF AN AGRICULTURAL COMBINE

(75) Inventors: Joshua J. Wolters, Geneseo, IL (US); Robert A. Matousek, Milan, IL (US); James R. Lucas, Naperville, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/334,026

(22) Filed: Dec. 30, 2002

(65) Prior Publication Data

US 2004/0127271 A1 Jul. 1, 2004

(51) Int. Cl.[7] .................................................. A01F 12/40
(52) U.S. Cl. ..................................... 460/112; 460/901
(58) Field of Search ................................ 460/111, 112, 460/119, 901

(56) References Cited

U.S. PATENT DOCUMENTS

| 1,729,199 A | 9/1929 | Wood |
| 3,746,264 A | 7/1973 | Diener et al. ............... 239/668 |
| 4,646,757 A | 3/1987 | Schmitt et al. ........... 130/27 R |
| 5,232,405 A | 8/1993 | Redekop et al. ............ 460/112 |
| 5,421,777 A | 6/1995 | Strubbe et al. ............... 460/13 |
| 5,569,081 A | * 10/1996 | Baumgarten et al. ....... 460/112 |
| 6,416,405 B1 | * 7/2002 | Niermann ..................... 460/79 |
| 6,602,131 B2 | * 8/2003 | Wolters ....................... 460/111 |

* cited by examiner

Primary Examiner—Robert E. Pezzuto
Assistant Examiner—Meredith Petravick
(74) Attorney, Agent, or Firm—Rebecca Henkel; Brant T. Maurer

(57) ABSTRACT

A multiple finger flow guide for a crop residue spreader including an element disposed in a housing and rotatable in a predetermined direction about an axis for driving a flow of crop residue through a discharge opening or outlet of the housing located at a predetermined angular position around the axis. The flow guide includes at least two elongate fingers, the fingers having proximal ends located adjacent to an upstream end of the discharge opening and the fingers extending from the proximal ends generally circumferentially to an arcuate or circular path of the flow to distal ends located spaced outwardly from the housing and the discharge opening, adjacent ones of the fingers defining spaces therebetween such that a desired portion of the flow will pass through the spaces so as to be spread onto an area of an agricultural field adjacent to the spreader and the remaining portions of the flow will be guided along the fingers so as to be spread over portions of the field a desired distance away from the spreader, such that the crop residue will be distributed evenly over a desired portion of the swath of a combine on which the spreader is used.

39 Claims, 5 Drawing Sheets

CROP RESIDUE FLOW GUIDE WITH FLOW-THROUGH CAPABILITY FOR A ROTARY CROP RESIDUE SPREADER OF AN AGRICULTURAL COMBINE

TECHNICAL FIELD

This invention relates generally to agricultural combines, and more particularly, to a flow guide for the discharge outlet of a rotary crop residue spreader, the flow guide including a plurality of fingers extending generally circumferentially relative to an arcuate or circular path of crop residue flow adjacent to a discharge opening of the spreader such that some of the crop flow will pass between the fingers so as to be distributed over a portion of an agricultural field adjacent to and below or nearby the spreader and some of the flow will be guided along the fingers so as to be propelled from the spreader and distributed over more distant portions of the field.

BACKGROUND ART

Currently, combines typically include a spreader for distributing material other than grain such as straw and chaff separated from the harvested crop over the crop field. In many instances it is desirable for the straw, chaff and other residue to be spread as evenly as possible over the width or swath of that section of the field over which the combine has just passed and harvested crop from, to avoid problems resulting from uneven spreading, such as, but not limited to, difficulty in passage of fall tillage tools through residue clumps or thick areas; uneven insulation of the field resulting in uneven field warming and thawing and crop emergence during the following planting season; and increased rodent and insect habitat.

Combine headers having a widths of 30 feet are currently well known, and headers having widths of 36 feet are also known. Although various crop residue spreaders are known which can propel residue a distance equal to about one half of these widths are available, a shortcoming found when using some such devices is that, in achieving a long distance spreading capability, often the spreader performs less than satisfactorily in spreading the crop residue evenly over areas of a field adjacent to, more particularly, near, behind or beneath, the spreader itself.

Thus, what is sought is a flow guide for a rotary crop residue spreader having a long distance spreading capability, but having a capability to better and more evenly spread crop residue beneath and nearby the spreader and outwardly away from the spreader, to avoid shortcomings and problems of the prior art devices discussed above.

SUMMARY OF THE INVENTION

What is disclosed is a flow guide for a crop residue spreader which overcomes many of the shortcomings and problems set forth above. The spreader typically includes an element disposed in a housing and rotatable in a predetermined direction about an axis for driving a flow of crop residue through a discharge opening or outlet of the housing located at a predetermined angular position around the axis. In a preferred embodiment, the flow guide includes at least two elongate fingers, the fingers having proximal ends located adjacent to an upstream end of the discharge opening and the fingers extending from the proximal ends generally circumferentially to an arcuate or circular path of the flow to distal ends located spaced outwardly from the housing and the discharge opening, adjacent ones of the fingers defining spaces therebetween such that a desired portion of the flow will pass through the spaces so as to be spread onto an area of an agricultural field adjacent to the spreader and the remaining portions of the flow will be guided along the fingers so as to be spread over portions of the field a desired distance away from the spreader, such that the crop residue will be distributed evenly over a desired portion of the swath of a combine on which the spreader is used.

According to another preferred aspect of the invention, a shield or deflector extends across an upstream end of the spaces between the fingers to block or limit flow of the crop residue through the spaces adjacent the upstream end thereof so as to produce a desired pattern of flow of the crop residue onto the areas of the field adjacent to the spreader. In this regard, in another preferred embodiment the shield or deflector can have a downstream edge that extends diagonally across the spaces at a desired angle to the longitudinal extent of the fingers so allow more flow through the spaces adjacent to one end of the spreader and less flow through the spaces adjacent to the opposite end. Other shapes and configurations for the downstream edge can also be used to provide desired dispersal of the crop residue over areas of a field adjacent to the spreader. The spreader can be oriented with the rotational axis oriented horizontally or nearly horizontally, such that the flow of crop residue through the spaces between the fingers is directed downwardly onto the ground beneath and closer to the spreader, or the axis can be more vertical, as desired, for achieving a desired crop residue distribution. The spreader can also have more than one of the rotatable elements. Using the present flow guide, better and more even distribution of the crop residue over an agricultural field is achieved, particularly with respect to areas of the field adjacent to the spreader, that is, generally beneath and behind the spreader, and areas of the field more distant from the spreader, such as at the extreme extent of the distribution pattern, which can be, for instance, equal to one-half the 30 to 40 foot width of the header of the combine.

DETAILED DESCRIPTION OF THE INVENTION

Figure 1:
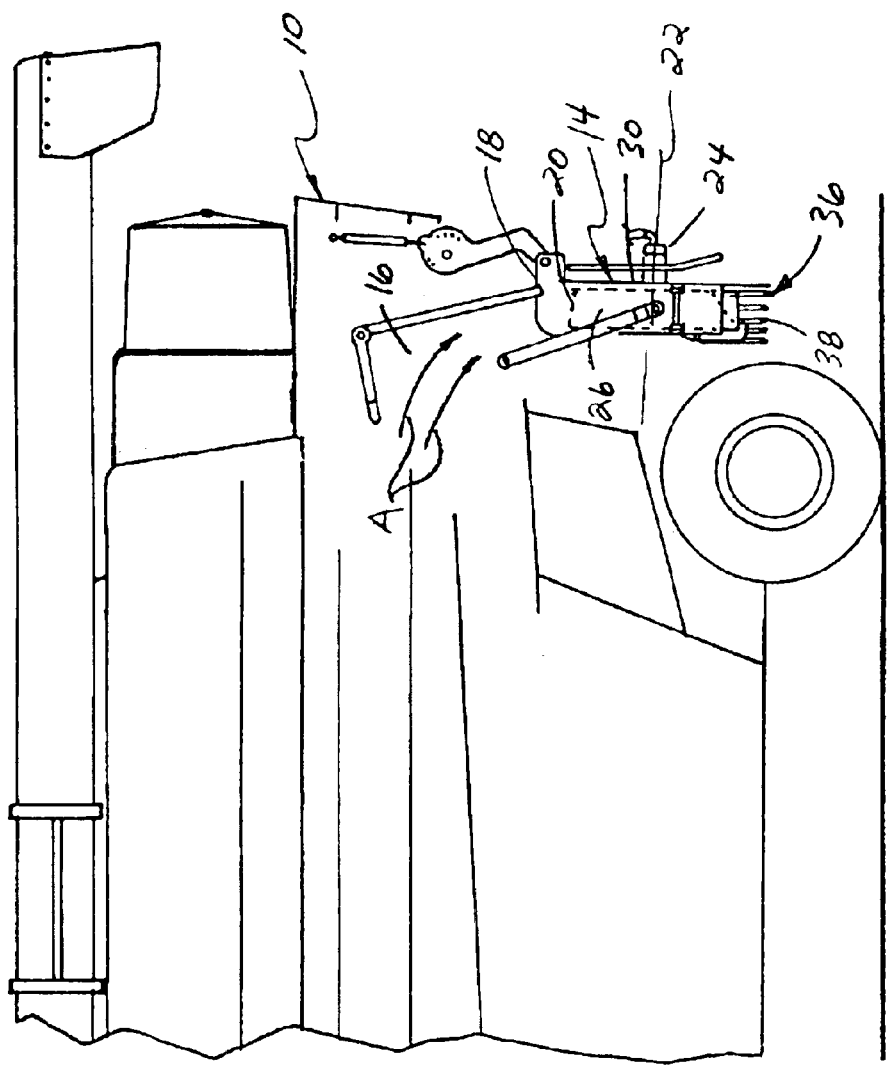
FIG. 1 is a simplified, fragmentary side elevational view of an agricultural combine including a crop residue spreader including flow guides according to the present invention.
Figure 2:
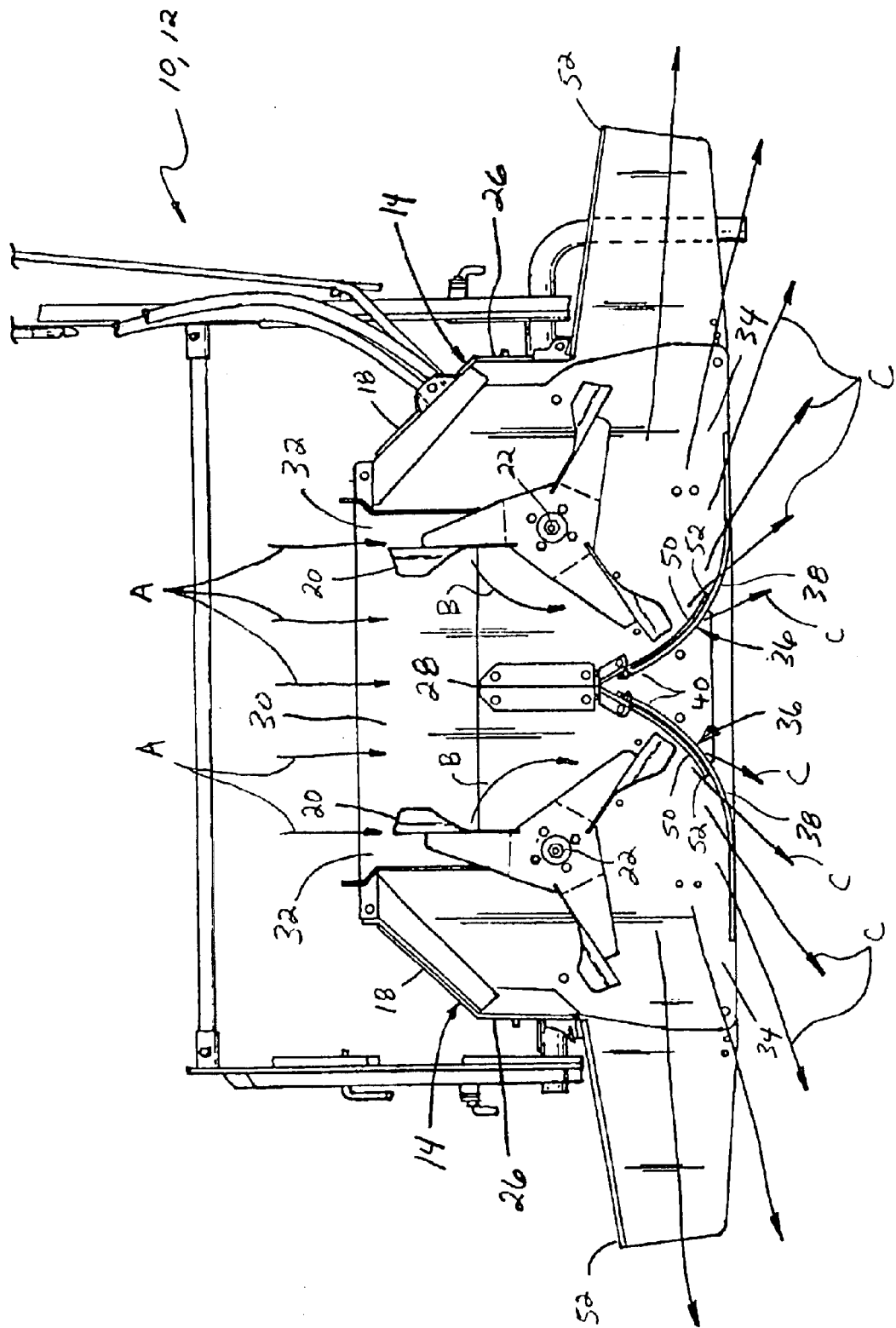
FIG. 2 is a simplified view from the front of the spreader and flow guides of FIG. 1, with arrows illustrating crop residue flow through and guided by the flow guides.

Referring now to the drawings, wherein preferred embodiments of the present invention are shown, in FIGS. 1 and 2, a rear end 10 of a self-propelled agricultural combine 12 is shown, including a pair of rearwardly located rotary devices or crop spreaders 14 representative of commonly used spreaders for spreading straw, stalks, husks and other crop residue and trash that has been separated from the grain of the crops by a threshing mechanism and/or a cleaning mechanism (not shown) of combine 12 located forwardly of rear end 10. The straw, stalks and the like are propelled rearwardly by rotating beaters or the like (also not shown) from the threshing mechanism and downwardly through an exhaust duct 16 as denoted by arrows A, to spreaders 14 for spreading thereby.

Each spreader 14 includes a housing 18 of sheet metal or other construction containing a spreader element 20 rotatable in a predetermined rotational direction, denoted by arrows B, about a rotational axis 22 by a suitable driving element, such as by a conventionally constructed and operable hydraulic motor 24 powered by pressurized hydraulic fluid received from a pump (not shown) of combine 12, an electric motor, belt, or the like, for propelling and optionally chopping the crop residue. In spreaders 14 shown here, rotational axis 22 is generally horizontal or oriented at only a small acute angle to horizontal, but could be positioned otherwise, such as in a more upright or vertical orientation, or at an angle between horizontal and vertical, as desired. Housing 18 of each spreader 14 is a generally forwardly open structure and includes spaced, opposed radial side walls 26 and 28, and a rear wall 30 extending therebetween, defining a cavity containing spreader element 20, as well as a forwardly and upwardly facing inlet opening 32 for receiving the residue flow denoted by arrows A, and a downwardly and radially sidewardly facing discharge opening or outlet 34 through which the residue is propelled by spreader element 20. Residue flow within housing 18 is propelled by rotating spreader element 20 in the predetermined rotational direction B along a generally arcuate or circular flow path, at a speed which is equal to or greater relative to the inlet speed of the residue flow such that the residue does not build up at the inlet and is expelled from housing 18 through outlet 34 at a corresponding speed. The speed imparted to the residue by spreader 14 will typically be selected so as to be sufficient for propelling the residue a substantial distance from combine 12 for deposition on regions of the agricultural field over which the combine 12 has just traveled and from which the crops have been harvested by combine 12, which, for instance, can be equal to about one-half the width of a header mounted on a forward end (not shown) of combine 12.

As noted above, it is desired in many instances to distribute the crop residue discharged by spreaders 14 substantially evenly over the width of a swath of the field from which the crop has just been harvested by combine 12, which width is typically defined by the overall width of a header of combine 12, which width can be as much as 30 to 40 feet in the instance of some headers currently in use. Thus, it is desirable that a spreader 14 have the capability to expel or propel crop residue a distance equal to about one-half the width of the header. Element 20 can be suitably configured and rotated at a sufficient velocity in the well known manner for propelling crop residue such as, but not limited to, chopped straw, stems and branches, cobs and the like, the required distance of up to one-half the width of a header currently being used, by a conventional hydraulic motor 24 shown or any other suitable driver. The problem to be currently overcome, however, is distributing the crop residue substantially evenly over the entire swath of the combine, particularly these distant areas and also the areas adjacent to the combine itself, and more particularly that portion of the area directly beneath and/or closely beside and behind spreader 14.

Figure 3:
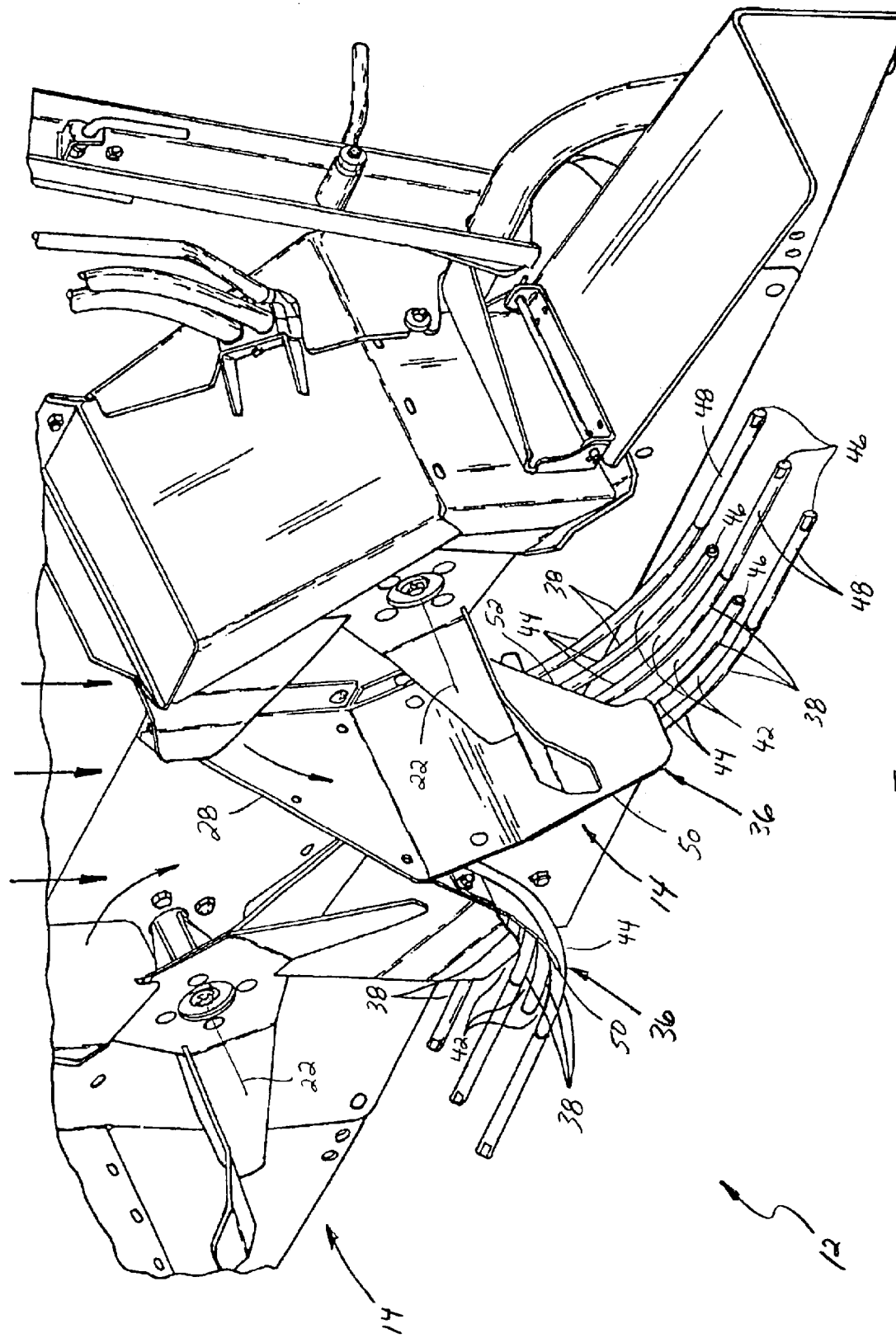
FIG. 3 is fragmentary perspective view of the spreader and flow guides of FIG. 1.
Figure 4:
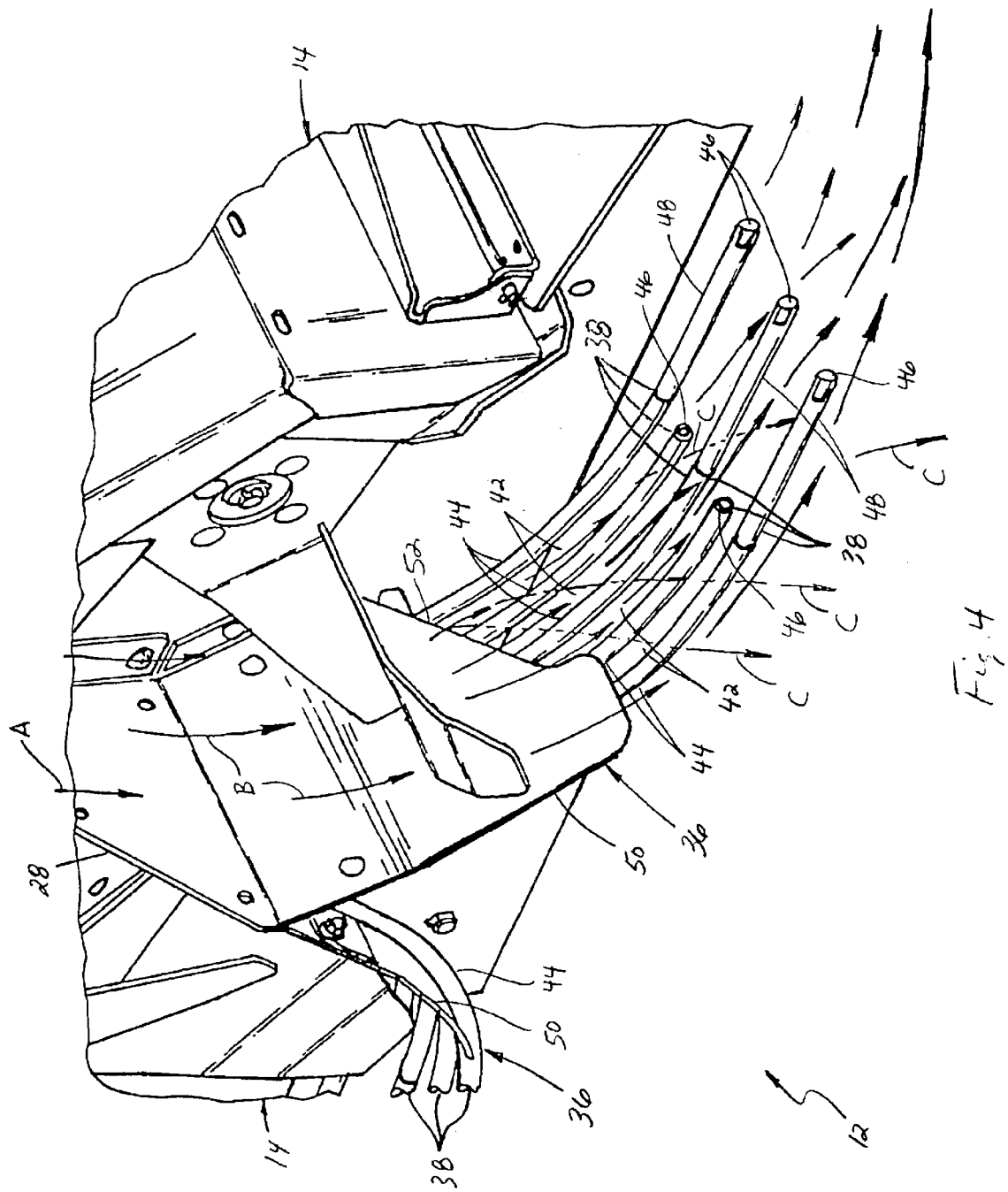
FIG. 4 is an enlarged fragmentary perspective view of the spreader and flow guides of FIG. 1, with arrows illustrating crop residue flow.

Referring also to FIGS. 3 and 4, crop residue flow guides 36 constructed and operable according to the teachings of the present invention are shown in conjunction with each spreader 14. Each flow guide 36 includes a plurality of elongate fingers 38 each having a first or proximal end 40 mounted to or otherwise supported adjacent to side wall 28 and an upstream end of outlet 34, as best shown in FIG. 2. Fingers 38 are shown arranged in a single axially extending row in axially spaced relation, defining longitudinally extending spaces 42 between adjacent ones of fingers 38. Fingers 38 each extend from proximal ends 40 in the direction of rotation B of respective spreader element 20. Each finger 38 preferably includes an arcuate or curved portion 44 adjacent proximal end 40 and extending in the direction of the flow and circumferentially with respect thereto so as to extend across or through outlet 34 to a distal end 46 of the finger. Alternating ones of fingers 38 preferably also include an elongate straight portion 48 between curved portion 44 and distal end 46 which extends at least generally tangentially to the flow path of the crop residue.

Flow guides 36 each preferably additionally include an arcuate, curved or angular shaped deflector or shield 50 supported or mounted adjacent to or on side wall 28 circumferentially to the path of element 20 so as to contain and guide the residue flow. Each shield 50 extends into the upstream end of outlet 34 in partially covering relation to curved portions 44 of fingers 38. Each shield 50 preferably has a downstream edge 52 that extends diagonally across fingers 38 at an acute angle relative to axis 22 of the spreader element 20, and which partially covers at least some of spaces 42 adjacent to the upstream end of outlet 34.

Referring more particularly to FIGS. 2 and 4, in operation, when a flow of crop residue is being fed through inlet opening 32 into housing 18 of each spreader 14, as shown by arrows A, the residue is accelerated by spreader element 20 in the direction of rotation in a generally circular path along side wall 28, as illustrated by arrows B. The flow will continue along the circular path guided by shield 50. Then, as a result of the presence of spaces 42 between fingers 38, some or a portion of the flow will be propelled downwardly through spaces 42, as denoted by arrows C, so as to be distributed and spread over that potion or area of a field adjacent to spreader 14, particularly the area below and beside the spreader. Due to the diagonal orientation of downstream edge 52 of shield 50, the portion of the flow passing between fingers 38 adjacent to the more upstream axial end of shield 50 will be more downwardly directed and will be deposited on the field closer to the centerline of combine 12, which is generally represented by side wall 28, and the portion of the flow passing between fingers 38 adjacent to the more downstream axial end of shield 50 will be directed downwardly but more sidewardly, so as to be deposited on the field more to the side of the centerline, and the flow passing between the middle fingers will be deposited on the field intermediate the center and side areas, all in a generally even manner. The portions of the flow guided by and along the shorter ones of fingers 38 will then be distributed over an area of the field sidewardly and outwardly of combine 12, and the portions of the flow guided by and along the longer ones of the fingers will be propelled sidewardly and outwardly a greater distance from combine 12, so as to be spread evenly over areas of the field up to a distance equal to about one-half the width of the header being used, from combine 12, it being sought that the distribution of the crop residue on the field be generally even between the various areas.

Typical combines, such as combine 12, generally can utilize more than one header for harvesting different types of crops, such as grasses such as wheat and the like, and alternatively, corn or the like, such that the residue spread by spreaders 14 in conjunction with flow guides 36 will have different flow characteristics. This can be due, for instance, to the different stalk and stem diameters and lengths of the different crops, pod sizes, cob sizes, and the like, and also moisture conditions. Additionally, different width heads may be used with a particular combine, and as a result it is often desired to alter the flow characteristics of the crop residue expelled from spreaders 14. Whether or not a spreader 14 additionally chops the residue will also be a factor. To provide a capability for modifying flow direction, shields 50 having different lengths and differently shaped and oriented downstream edges 52 can be mounted and positioned as required to achieve a desired spreading capability. Also, housing 18 can include optional adjustable deflectors 54 attached to housing 18 downstream along the paths or trajectories of flow. Deflectors 54 can by moved at least in the up and down directions to be positioned a desired angle for deflecting, redirecting, damping or combining one or more of the flow portions or a portion thereof, to achieve a desired maximum range of crop residue distribution over a field.

Figure 5:
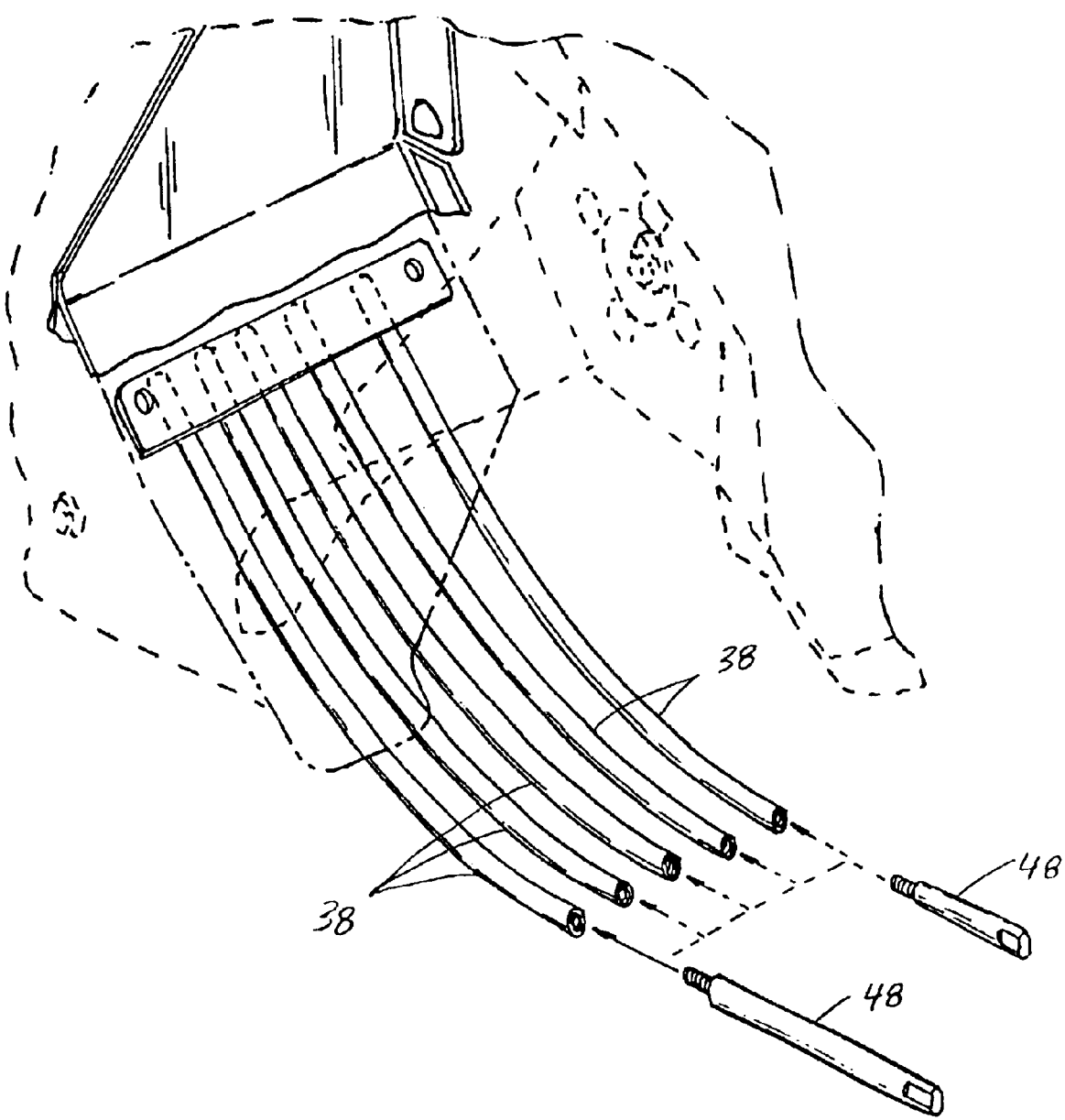
FIG. 5 is a perspective view of the flow guides, illustrating installation of different optional extensions thereon.

Still further, as shown in FIG. 5, different length and shape fingers 38 and straight portions 48 can be used, in greater or lesser number than shown, so as to, for instance, provide different width, length and shape spaces 42 therebetween. Here, fingers 38 are shown having more round cross sectional shapes, but other sectional shapes such as oval, rectangular, square, triangular, or the like can be used. Other longitudinal shapes for curved portions 44 can also be used. Straight portions 48 are also optionally shown as being threadedly or otherwise mountable on fingers 38, and therefore easily removable and replaceable, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a crop residue spreader including an element disposed in a housing and rotatable in a predetermined direction about an axis for driving a flow of crop residue through a discharge opening of the housing located at a predetermined angular position around the axis, an improvement comprising:

a flow guide including at least two elongate fingers, the fingers having proximal ends located adjacent to an upstream end of the discharge opening relative to a direction of the flow and extending from the proximal ends generally circumferentially to the path of the flow to distal ends located spaced outwardly from the housing and the discharge opening, adjacent ones of the fingers defining spaces therebetween such that portions of the flow will pass through the spaces so as to be spread onto areas of an agricultural field adjacent to the spreader and other portions of the flow will be guided along the fingers so as to be propelled from the spreader and spread over areas of the field a desired distance from the spreader; and a shield positioned in covering relation to less than an entire portion of the space between at least two adjacent ones of the fingers adjacent the proximal ends thereof for limiting flow through the portion of the space.

2. In the crop residue spreader of claim 1, the improvement further comprising the shield having a downstream end relative to the direction of the flow which extends diagonally across the portion of the space so as to allow more of the flow to pass between the fingers adjacent to a first axial end of the spreader and less of the flow to pass between the fingers adjacent to a second axial end of the spreader opposite the first end.

3. In the crop residue spreader of claim 1, the improvement further comprising at least one of the fingers having a length measured between the proximal and distal ends thereof which is greater than a length of at least one other of the fingers measured between the proximal and distal ends thereof.

4. In the crop residue spreader of claim 1, the improvement further comprising each of the fingers having a longitudinally extending arcuate shape portion adjacent the proximal end thereof.

5. In the crop residue spreader of claim 4, the improvement comprising some of the fingers having an elongate straight portion extending from the arcuate shape portion to the distal end thereof in tangential relation to the crop flow.

6. In the crop residue spreader of claim 5, the improvement comprising alternating ones of the fingers including the elongate straight portion.

7. In the crop residue spreader of claim 1, the improvement comprising the fingers having a generally round cross sectional shape.

8. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader; and a shield positioned in covering relation to less than an entire portion of the space between at least two adjacent ones of the fingers adjacent the first end for limiting flow through the portion of the space.

9. The flow guide of claim 8, wherein the fingers are arranged in a single row.

10. The flow guide of claim 8, wherein adjacent ones of the fingers have different lengths as measured between the first end and the distal ends thereof, respectively.

11. The flow guide of claim 8, further comprising at least one deflector disposed along the flow path adjacent the first end of the flow guide for blocking passage of the flow through the space between the fingers.

12. The flow guide of claim 8, wherein some of the fingers include an elongate straight portion adjacent the distal end thereof and extending generally tangentially to the arcuate flow path.

13. The flow guide of claim 8, wherein the fingers each have a generally round cross-sectional shape.

14. The flow guide of claim 8, wherein each of the fingers has an arcuate shape portion adjacent to the first end.

15. The flow guide of claim 14, wherein each of the fingers has an elongate straight portion extending from the arcuate shape portion to the distal end thereof.

16. The flow guide of claim 15, wherein alternating ones of the fingers including the elongate straight portion.

17. The flow guide of claim 8, further comprising the shield having an end which extends diagonally across the portion of the space so as to limit more of the flow adjacent a first axial end of the spreader and less of the flow adjacent a second axial end of the spreader opposite the first end.

18. A rotary crop residue spreader for an agricultural combine, comprising:
a housing mountable to the combine in position for receiving crop residue from at least a threshing mechanism thereof and containing an element disposed for rotation in a predetermined direction therein about a rotational axis for generating a rotary flow of the crop residue in the predetermined rotational direction along a flow path within the housing for discharge therefrom through a radially facing outlet; and
a flow guide including a shield disposed adjacent to an upstream end of the outlet generally radially outwardly of the flow path, and a plurality of axially spaced elongate fingers extending from the shield in generally circumferential and tangential relation to the flow path, the shield being positioned in covering relation to less than an entire portion of the space between at least two adjacent ones of the fingers adjacent the upstream end for limiting flow through the portion of the space, each of the fingers terminating at a distal end spaced from the shield, adjacent ones of the fingers defining spaces therebetween, respectively, such that some portions of the flow of the crop residue will be propelled from the spreader through the spaces, while remaining portions of the flow will be propelled from the spreader longitudinally along the fingers.

19. The spreader of claim 18, wherein the shield has a downstream edge extending across the spaces between the fingers at an acute angle to the longitudinal extent thereof so as to define upstream peripheries, respectively, of the spaces at different longitudinal positions along the flow path.

20. The spreader of claim 18, wherein the fingers each have a generally round cross-sectional shape.

21. The spreader of claim 18, wherein each of the fingers has a longitudinally extending arcuate shape portion adjacent to the shield.

22. The spreader of claim 21, wherein some of the fingers have a longitudinally extending straight portion extending tangentially relative to the flow from the arcuate shape portion to the distal end thereof.

23. The spreader of claim 22, wherein alternating ones of the fingers include the straight portion.

24. In a crop residue spreader including an element disposed in a housing and rotatable in a predetermined direction about an axis for driving a flow of crop residue through a discharge opening of the housing located at a predetermined angular position around the axis, an improvement comprising:
a flow guide including at least two elongate fingers, the fingers having proximal ends located adjacent to an upstream end of the discharge opening relative to a direction of the flow and extending from the proximal ends generally circumferentially to the path of the flow to distal ends located spaced outwardly from the housing and the discharge opening, adjacent ones of the fingers defining spaces therebetween such that portions of the flow will pass through the spaces so as to be spread onto areas of an agricultural field adjacent to the spreader and other portions of the flow will be guided along the fingers so as to be propelled from the spreader and spread over areas of the field a desired distance from the spreader;
a shield positioned in covering relation to a portion of the space between at least two adjacent ones of the fingers adjacent the proximal ends thereof for limiting flow through the portion of the space, the shield having a downstream end relative to the direction of the flow which extends diagonally across the portion of the space so as to allow more of the flow to pass between the fingers adjacent to a first axial end of the spreader and less of the flow to pass between the fingers adjacent to a second axial end of the spreader opposite the first end.

25. In a crop residue spreader including an element disposed in a housing and rotatable in a predetermined direction about an axis for driving a flow of crop residue through a discharge opening of the housing located at a predetermined angular position around the axis, an improvement comprising:
a flow guide including at least two elongate fingers, the fingers having proximal ends located adjacent to an upstream end of the discharge opening relative to a direction of the flow and extending from the proximal ends generally circumferentially to the path of the flow to distal ends located spaced outwardly from the housing and the discharge opening, adjacent ones of the fingers defining spaces therebetween such that portions of the flow will pass through the spaces so as to be spread onto areas of an agricultural field adjacent to the spreader and other portions of the flow will be guided along the fingers so as to be propelled from the spreader and spread over areas of the field a desired distance from the spreader, at least one of the fingers having a length measured between the proximal and distal ends thereof which is greater than a length of at least one other of the fingers measured between the proximal and distal ends thereof.

26. In a crop residue spreader including an element disposed in a housing and rotatable in a predetermined direction about an axis for driving a flow of crop residue through a discharge opening of the housing located at a predetermined angular position around the axis, an improvement comprising:
a flow guide including at least two elongate fingers, the fingers having proximal ends located adjacent to an upstream end of the discharge opening relative to a direction of the flow and extending from the proximal ends generally circumferentially to the path of the flow to distal ends located spaced outwardly from the housing and the discharge opening, adjacent ones of the fingers defining spaces therebetween such that portions of the flow will pass through the spaces so as to be spread onto areas of an agricultural field adjacent to the spreader and other portions of the flow will be guided along the fingers so as to be propelled from the spreader and spread over areas of the field a desired distance from the spreader, each of the fingers having a longitudinally extending arcuate shape portion adjacent the proximal end thereof and some of the fingers having an elongate straight portion extending from the arcuate shape portion to the distal end thereof in tangential relation to the crop flow.

27. In the crop residue spreader of claim 26, the improvement comprising alternating ones of the fingers including the elongate straight portion.

28. In a crop residue spreader including an element disposed in a housing and rotatable in a predetermined direction about an axis for driving a flow of crop residue through a discharge opening of the housing located at a predetermined angular position around the axis, an improvement comprising:

a flow guide including at least two elongate fingers, the fingers having proximal ends located adjacent to an upstream end of the discharge opening relative to a direction of the flow and extending from the proximal ends generally circumferentially to the path of the flow to distal ends located spaced outwardly from the housing and the discharge opening, adjacent ones of the fingers defining spaces therebetween such that portions of the flow will pass through the spaces so as to be spread onto areas of an agricultural field adjacent to the spreader and other portions of the flow will be guided along the fingers so as to be propelled from the spreader and spread over areas of the field a desired distance from the spreader, the fingers having a generally round cross sectional shape.

29. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader, wherein adjacent ones of the fingers have different lengths as measured between the first end and the distal ends thereof, respectively.

30. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader; and at least one deflector disposed along the flow path adjacent the first end of the flow guide for blocking passage of the flow through the space between the fingers.

31. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader, wherein some of the fingers include an elongate straight portion adjacent the distal end thereof and extending generally tangentially to the arcuate flow path.

32. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader, wherein the fingers each have a generally round cross-sectional shape.

33. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader, wherein each of the fingers has an arcuate shape portion adjacent to the first end, and wherein each of the fingers has an elongate straight portion extending from the arcuate shape portion to the distal end thereof.

34. The flow guide of claim 33, wherein alternating ones of the fingers including the elongate straight portion.

35. A flow guide for a rotary crop residue spreader, the spreader including an element disposed in a housing and rotatable in a predetermined direction therein about a rotational axis for generating a flow of crop residue in the predetermined rotational direction along a generally arcuate flow path within the housing for discharge therefrom through a radially facing opening thereof located at a predetermined position around the axis, the flow guide comprising:

a first end disposed adjacent to the discharge opening and extending along the flow path, and a plurality of elongate fingers extending in the predetermined rotational direction from the first end, each of the fingers terminating at a distal end located generally in the predetermined direction radially outwardly of the discharge opening, the fingers being spaced apart in the axial direction one relative to the other defining spaces therebetween, wherein a portion of the flow will be able to pass through the spaces between the fingers so as to be deposited on an area of an agricultural field adjacent to the spreader, and a portion of the flow will be guided by the fingers outwardly from the spreader so as to be spread over an area of the field a desired distance spaced from the spreader; and a shield positioned in covering relation to a portion of the space between at least two adjacent ones of the fingers adjacent the first end for limiting flow through the portion of the space, the shield having an end which extends diagonally across the portion of the space so as to limit more of the flow adjacent a first axial end of the spreader and less of the flow adjacent a second axial end of the spreader opposite the first end.

36. A rotary crop residue spreader for an agricultural combine, comprising:

a housing mountable to the combine in position for receiving crop residue from at least a threshing mechanism thereof and containing an element disposed for rotation in a predetermined direction therein about a rotational axis for generating a rotary flow of the crop residue in the predetermined rotational direction along a flow path within the housing for discharge therefrom through a radially facing outlet; and a flow guide including a shield disposed adjacent to an upstream end of the outlet generally radially outwardly of the flow path, and a plurality of axially spaced elongate fingers extending from the shield in generally circumferential and tangential relation to the flow path, each of the fingers terminating at a distal end spaced from the shield, adjacent ones of the fingers defining spaces therebetween, respectively such that some portions of the flow of the crop residue will be propelled from the spreader through the spaces, while remaining portions of the flow will be propelled from the spreader longitudinally along the fingers, wherein the shield has a downstream edge extending across the spaces between the fingers at an acute angle to the longitudinal extent thereof so as to define upstream peripheries, respectively, of the spaces at different longitudinal positions along the flow path.

37. A rotary crop residue spreader for an agricultural combine, comprising:

a housing mountable to the combine in position for receiving crop residue from at least a threshing mechanism thereof and containing an element disposed for rotation in a predetermined direction therein about a rotational axis for generating a rotary flow of the crop residue in the predetermined rotational direction along a flow path within the housing for discharge therefrom through a radially facing outlet; and a flow guide including a shield disposed adjacent to an upstream end of the outlet generally radially outwardly of the flow path, and a plurality of axially spaced elongate fingers extending from the shield in generally circumferential and tangential relation to the flow path, each of the fingers terminating at a distal end spaced from the shield, adjacent ones of the fingers defining spaces therebetween, respectively, such that some portions of the flow of the crop residue will be propelled from the spreader through the spaces, while remaining portions of the flow will be propelled from the spreader longitudinally along the fingers, wherein the fingers each have a generally round cross-sectional shape.

38. A rotary crop residue spreader for an agricultural combine, comprising:

a housing mountable to the combine in position for receiving crop residue from at least a threshing mechanism thereof and containing an element disposed for rotation in a predetermined direction therein about a rotational axis for generating a rotary flow of the crop residue in the predetermined rotational direction along a flow path within the housing for discharge therefrom through a radially facing outlet; and a flow guide including a shield disposed adjacent to an upstream end of the outlet generally radially outwardly of the flow path, and a plurality of axially spaced elongate fingers extending from the shield in generally circumferential and tangential relation to the flow path, each of the fingers terminating at a distal end spaced from the shield, adjacent ones of the fingers defining spaces therebetween, respectively, such that some portions of the flow of the crop residue will be propelled from the spreader through the spaces, while remaining portions of the flow will be propelled from the spreader longitudinally along the fingers, wherein some of the fingers have a longitudinally extending strait portion extending tangentially relative to the flow from the arcuate shape portion to the distal end thereof.

39. The spreader of claim 38, wherein alternating ones of the fingers include the straight portion.

* * * * *